US011770313B2

(12) United States Patent
Rhee (10) Patent No.: US 11,770,313 B2
(45) Date of Patent: Sep. 26, 2023

(54) METHOD, APPARATUS, AND SYSTEM FOR OPTIMIZING PERFORMANCE OF A COMMUNICATION UNIT BY A REMOTE SERVER

(71) Applicant: ASSIA SPE, LLC, Wilmington, DE (US)

(72) Inventor: Wonjong Rhee, San Francisco, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 17/102,099

(22) Filed: Nov. 23, 2020

(65) Prior Publication Data

US 2021/0075703 A1    Mar. 11, 2021

Related U.S. Application Data

(63) Continuation of application No. 14/356,581, filed as application No. PCT/US2011/060265 on Nov. 10, 2011, now Pat. No. 10,848,398.

(51) Int. Cl.
*H04L 12/26* (2006.01)
*H04L 43/04* (2022.01)
(Continued)

(52) U.S. Cl.
CPC ............ *H04L 43/04* (2013.01); *H04L 1/0019* (2013.01); *H04L 1/20* (2013.01)

(58) Field of Classification Search
CPC . H04L 1/00; H04L 1/0019; H04L 1/20; H04L 41/00; H04L 41/06;
(Continued)

(56) References Cited

U.S. PATENT DOCUMENTS 5,970,064 A    10/1999    Clark et al.
2003/0031180 A1    2/2003    Datta et al.
(Continued)

FOREIGN PATENT DOCUMENTS

WO    2013070232 A1    5/2013
WO    2013085485 A1    6/2013
(Continued)

OTHER PUBLICATIONS

"LAN Segmentation", tripod.com (Year: 2002).*
(Continued)

*Primary Examiner* — Boris D Grijalva Lobos
(74) *Attorney, Agent, or Firm* — North Weber & Baugh LLP; Michael North (57) ABSTRACT

Described herein are apparatus, system, and method for optimizing performance of one or more communication units by a remote server. The method comprises: collecting data from the one or more communication units; generating a policy, for each of the one or more communication units, based on the collected data; and sending the policy to each of the one or more communication units, wherein the policy comprises conditions for operation of the one or more communication units, wherein the one or more communication units implement the policy according to time-varying data. The system comprises: one or more communication units; and a server operable to communicate with the one or more communication units, wherein the server comprises: a memory; and a processor, coupled to the memory, and operable to perform the method discussed above.

23 Claims, 6 Drawing Sheets

(51) Int. Cl.
  *H04L 1/20* (2006.01)
  *H04L 1/00* (2006.01)
(58) Field of Classification Search
  CPC ....... H04L 41/08–0806; H04L 41/0813–0836;
       H04L 41/085–0859; H04L 41/0866–0869;
       H04L 41/50–5016; H04L 41/5035; H04L
       41/5038; H04L 43/00; H04L 43/04; H04L
       43/08–0817; H04L 43/0876–10; H04L
       43/16; H04L 47/00; H04L 47/10; H04L
       47/11; H04L 47/12; H04L 47/28; H04L
       47/29; H04L 47/32; H04L 7/00; H04L
       7/0004
  See application file for complete search history.

(56) References Cited

U.S. PATENT DOCUMENTS

| | | | |
|---|---|---|---|
| 2004/0143428 A1 | 7/2004 | Rappaport et al. | |
| 2005/0025163 A1 | 2/2005 | Christie, IV | |
| 2005/0182848 A1 | 8/2005 | McNeil, Jr. et al. | |
| 2005/0190868 A1 | 9/2005 | Khandekar et al. | |
| 2006/0126613 A1 | 6/2006 | Zweig | |
| 2006/0187885 A1 | 8/2006 | Roy et al. | |
| 2008/0159124 A1 | 7/2008 | Sasaki | |
| 2008/0186873 A1 | 8/2008 | Pujet et al. | |
| 2009/0016358 A1 | 1/2009 | Lee | |
| 2009/0180380 A1 | 7/2009 | Prabhakar et al. | |
| 2009/0201805 A1 | 8/2009 | Begen et al. | |
| 2009/0207730 A1 | 8/2009 | Stamoulis et al. | |
| 2009/0245130 A1 | 10/2009 | Bing | |
| 2009/0248835 A1 | 10/2009 | Panda et al. | |
| 2009/0287827 A1 | 11/2009 | Horn et al. | |
| 2009/0310528 A1 | 12/2009 | Tamura | |
| 2010/0034135 A1 | 2/2010 | Kim et al. | |
| 2010/0167771 A1* | 7/2010 | Raghothaman | H04B 17/318 455/501 |
| 2010/0290465 A1 | 11/2010 | Ankaiah et al. | |
| 2010/0316012 A1 | 12/2010 | Stanwood et al. | |
| 2011/0013529 A1 | 1/2011 | Bin et al. | |
| 2011/0128916 A1 | 6/2011 | Kwon et al. | |
| 2011/0182182 A1 | 7/2011 | Yang et al. | |
| 2011/0273979 A1 | 11/2011 | Grabelsky et al. | |
| 2013/0077482 A1 | 3/2013 | Krishna et al. | |
| 2014/0269269 A1 | 9/2014 | Kovvali et al. | |
| 2014/0269300 A1 | 9/2014 | Bennis | |
| 2014/0280679 A1 | 9/2014 | Dey et al. | |
| 2014/0304408 A1 | 10/2014 | Rhee | |
| 2015/0172216 A1 | 6/2015 | Bellizia et al. | |
| 2015/0326455 A1 | 11/2015 | Hui et al. | |
| 2016/0242194 A1 | 8/2016 | Mitola et al. | |
| 2016/0323015 A1 | 11/2016 | Henry et al. | |
| 2018/0242191 A1 | 8/2018 | Lundqvist et al. | |
| 2019/0364457 A1 | 11/2019 | Szilagyi et al. | |

FOREIGN PATENT DOCUMENTS

| | | |
|---|---|---|
| WO | 2016123497 A1 | 8/2016 |
| WO | 2018068857 A1 | 4/2018 |

OTHER PUBLICATIONS

Notice of Allowance dated Mar. 15, 2021, in related Canadian patent application No. 3,034,504, (1 pg).
Non-Final Office Action dated Dec. 4, 2020 in related U.S. Appl. No. 15/845,977, filed Dec. 18, 2017, (45 pgs).
CA Office Action dated Oct. 2, 2020 in related Canadian patent application No. 2,855,461, (4 pgs).
CA Office Action Response filed Feb. 2, 2021 in related Canadian patent application No. 2,855,461, (12 pgs).
Examination report 1. dated May 27, 2021, in related Australian patent application No. 2020202897, (7 pgs).
Office Action dated Jul. 9, 2021, in related Canadian patent application No. 2,855,461, (3 pgs).
Non-Final Office Action dated Aug. 2, 2021 in related U.S. Appl. No. 16/705,180, filed Dec. 5, 2019, (32 pgs).
Exam Report dated Jul. 28, 2021 in related patent application No. 18 211 162.5, (5 pgs).
Exam Report Response filed Aug. 20, 2021 in related patent application No. 18 211 162.5, (16 pgs).
Exam Report No. 2 dated Feb. 8, 2021 in related patent application No. 18160805.0, (6 pgs).
Exam Report No. 2 Response filed Jun. 14, 2021 in related patent application No. 18160805.0, (12 pgs).
Non-Final office action dated Aug. 31, 2021 in related U.S. Appl. No. 15/845,977, (42 pgs).
European office action dated Oct. 26, 2021 in related European patent application No. 18211162.5, (4 pgs).
Response to Canadian office action filed Sep. 23, 2021 in related Canadian patent application No. 2855461, (5 pgs).
European exam report dated Sep. 10, 2021 in related European patent application No. 18160805.0, (7 pgs).
Non-Final office action dated Sep. 27, 2021 in related U.S. Appl. No. 16/804,000, (39 pgs).
European office action dated Sep. 22, 2021 in related European patent application No. 11787994.0, (7 pgs).
Response to non-final office action filed Nov. 8, 2021 in related U.S. Appl. No. 16/705,180, (6 pgs).
Notice of allowance dated Jul. 8, 2022 in related Australian patent application No. 2020202897, (3 pgs).
European office action response filed Feb. 25, 2022 in related European patent application No. 18211162.5, (3 pgs).
European office action response filed Jan. 7, 2022 in related European patent application No. 18160805.0, (4 pgs).
European office action dated May 20, 2022 in related European patent application No. 18211162.5, (5 pgs).
Australian office action response filed May 25, 2022 in related Australian patent application No. 2020202897, (6 pgs).
Response to final office action filed Jun. 19, 2022 in related U.S. Appl. No. 15/845,977, (12 pgs).
Advisory action dated Aug. 5, 2022 in related U.S. Appl. No. 15/845,977, (3 pgs).
Notice of allowance dated Jul. 8, 2022 in related European patent application No. 11787994.0, (7 pgs).
Australian office action dated Jun. 9, 2022 in related Australian patent application No. 2020229857, (3 pgs).
Notice of Allowance dated Dec. 1, 2021 in related U.S. Appl. No. 16/705,180, (15 pgs).
Canadian office action dated Oct. 3, 2022 in related Canadian application No. 3,129,522, (4 pgs).
Response to Non-Final office action filed Jul. 28, 2022 in U.S. Appl. No. 16/804,000, (11 pgs).
Indian hearing notice dated Aug. 17, 2022 in related Indian patent application No. 1113/MUMNP/2014, (2 pgs).
Indian hearing response filed Sep. 16, 2022 in Indian patent application No. 1113/MUMNP/2014, (633 pgs).
Indian certificate granted, with allowed claims dated Sep. 30, 2022 in Indian patent application No. 1113/MUMNP/2014, (8 pgs).
Response to final office action & RCE filed Sep. 9, 2022 in U.S. Appl. No. 15/845,977, (11 pgs).
Canadian office action dated Sep. 29, 2022 in Canadian patent application No. 3,124,797, (5 pgs).
Indian office action dated Sep. 16, 2022 in related Indian patent application No. 202117038738, (6 pgs).
Response to European office action filed Oct. 7, 2022 in European patent application No. 18160805.0, (9 pgs).
European search report dated Oct. 7, 2022 in related European patent application No. 20762897.5, (11 pgs).
Yaohua Sun et al: "Application of Machine Learning in Wireless Networks: Key Techniques and Open Issues", arxiv.org, Cornell University Library, 201 Olin Library Cornell University Ithaca, NY 14853, Sep. 24, 2018, XP081194458, available from the Internet, <URL:https://arxiv.org/pdf/1809.08707.pdf>, (34 pgs).
Non-final office action dated Nov. 22, 2022 in U.S. Appl. No. 15/845,977, (43 pgs).

(56) References Cited

OTHER PUBLICATIONS

European office action dated Nov. 22, 2022 in the European patent application No. 18211162.5, (27 pgs).
Chinese response to office action filed Nov. 29, 2022, in the Chinese patent application No. 202010074633.2, (10 pgs).
Canadian response to office action filed Jan. 27, 2023 in Canadian patent application No. 3,124,797, (2 pgs).
Chinese office action dated Jan. 10, 2023, in the Chinese patent application No. 202010074633.2, (26 pgs).
Response to Canadian examination report filed Feb. 3, 2023 in Canadian patent application No. 3,129,522, (15 pgs).
Notice of Allowance dated Jan. 4, 2023 in U.S. Appl. No. 16/804,000, (19 pgs).
Response to non-final office action filed Feb. 22, 2023 in U.S. Appl. No. 15/845,977, (13 pgs).
Response to Chinese office action dated Jan. 10, 2023 filed Mar. 16, 2023, in the Chinese patent application No. 202010074633.2, (5 pgs).
Canadian Notice of Allowance dated May 10, 2023 in Canadian patent application No. 3,124,797, (1 pg).
Notice of Allowance dated May 24, 2023 in U.S. Appl. No. 15/845,977, (23 pgs).
Chinese office action dated Apr. 17, 2023, in the Chinese patent application No. 202010074633.2, (27 pgs).
European office action filed Aug. 9, 2023 in related European patent application No. 20762897.5, (56 pgs).
Response to Chinese office action dated filed Jul. 26, 2023, in the Chinese patent application No. 202010074633.2, (3 pgs).
Canadian Notice of Allowance dated Jun. 30, 2023 in Canadian patent application No. 3,129,522, (1 pg).
European summons to attend oral proceedings pursuant to Rule 115(1) EPC, mailed Jun. 29, 2023 in EP patent application No. 18211162.5, (5 pgs).

\* cited by examiner

METHOD, APPARATUS, AND SYSTEM FOR OPTIMIZING PERFORMANCE OF A COMMUNICATION UNIT BY A REMOTE SERVER

CROSS-REFERENCE TO RELATED APPLICATIONS

This application is a continuation of and claims priority to previously filed and co-pending U.S. patent application Ser. No. 14/356,581, entitled "METHOD, APPARATUS, AND SYSTEM FOR OPTIMIZING PERFORMANCE OF A COMMUNICATION UNIT BY A REMOTE SERVER" naming as inventor Wonjong Rhee, and filed May 6, 2014, which is the 371 national phase of International Patent Application No. PCT/US2011/060265, entitled "METHOD, APPARATUS, AND SYSTEM FOR OPTIMIZING PERFORMANCE OF A COMMUNICATION UNIT BY A REMOTE SERVER" naming as inventor Wonjong Rhee, and filed Nov. 10, 2011, which applications are hereby incorporated by reference in their entireties.

FIELD OF INVENTION

Embodiments of the invention relate generally to the field of communication systems. More particularly, embodiments of the invention relate to method, apparatus, and system for optimizing performance of a communication unit by a remote server.

BACKGROUND

Figure 1:
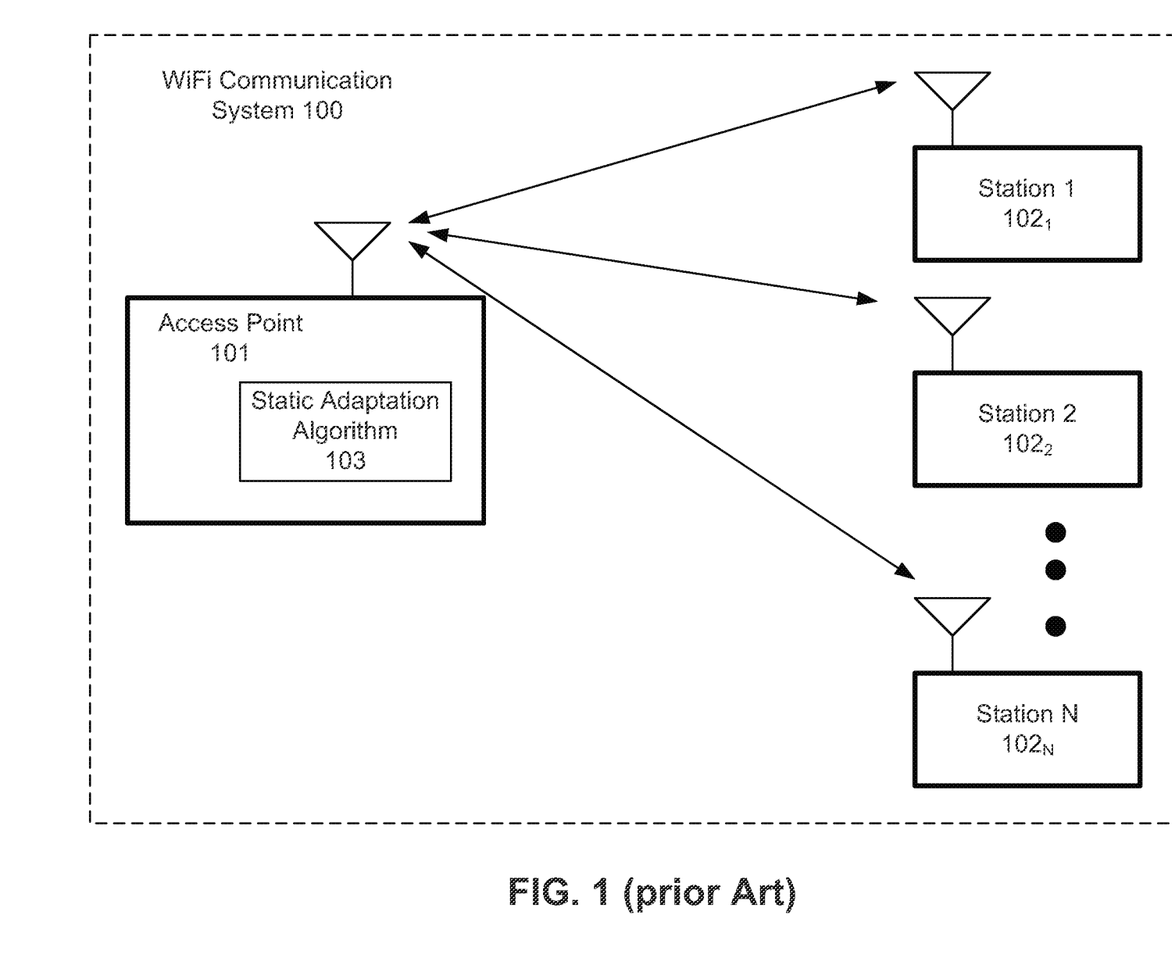
FIG. 1 is a high level system of a typical communication system using a static adaptive algorithm.

FIG. 1 is an exemplary prior art communication system (CS) 100 with an access point (AP) 101 and one or more wireless stations 102.sub.1-N. The AP 101 exchanges user data with the one or more stations 102.sub.1-N over wireless channels indicated by the arrows. The characteristics of the wireless channels and noise/interference are not constant and vary rapidly over time. For example, noise and interference levels from nearby noise/interference sources rapidly changes that cause the characteristics of the wireless environment to change. To cope with such rapid changes in the noise and interference levels, the CS 100 adapts transmission strategies to enhance performance of CS 100. One such known strategy is Adaptation Algorithm. The term "Adaptation Algorithm" herein refers to time-varying and environment-change-dependent transmission or control strategies for a CS. The adaptation algorithm is implemented in the AP 101 that adapts the wireless channels and noise/interference for communication with the one or more stations 102.sub.1-N.

For instance, the transmission rate of Institute of Electrical and Electronics Engineer (IEEE) 802.11g standard based WiFi communication system is rapidly adapted between 6 Mbps and 54 Mbps depending on the link quality and the rate selection method (also known as the rate adaptation algorithm) implemented in the WiFi communication system. Such rate adaptation algorithm within the WiFi communication system uses real-time data that are collected by the AP 101 of the WiFi communication system itself as an input to the adaptation algorithm 103, and a rate change in the link occurs when the real-time data meets a pre-defined criteria.

A possible rate adaptation algorithm 103 is to change transmission rate of signals by the AP 101 within the WiFi communication system when the measured RSSI (Received Signal Strength Indication) becomes too large or too small for the current rate in use. Another possible adaptation algorithm 103 is to increase the transmission rate of signals by the AP 101 whenever packets are successfully received by the AP 101 and/or the one or more stations 102.sub.1-N for M (e.g., 3) times and decrease rate whenever packets are unsuccessfully received for P (e.g., 2) times. While such adaptation algorithms 103 are required for WiFi communication systems to function properly, the rules and thresholds used by the methods are decided by a system designer of the WiFi communication system. Furthermore, a specific adaptation algorithm 103 is included in the firmware and loaded to the WiFi communication system. Hence, the adaption algorithm 103 is static in nature.

Therefore, the actual performance of the rate adaptation algorithm 103 is dependent on the assumptions made by the designer of the WiFi communication system. These assumptions may be static assumptions that do not change over time. The designer's assumptions, however, may be quite different from the actual operational environments and the WiFi communication system 100 may suffer from low performance due to non-ideal design of the static adaptation algorithm 103.

The impact of such differences in the assumptions can be significant in a large-scale deployment where many communication devices, such as AP's, independently operate. In such a deployment, every single communication environment is unique and the best adaptation method for each environment can be quite dependent on its own environment.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

SUMMARY OF THE INVENTION

The following presents a simplified summary of the embodiments of the invention in order to provide a basic understanding of some aspects of the embodiments. This summary is not an extensive overview of the embodiments of the invention. It is intended to neither identify key or critical elements of the embodiments nor delineate the scope of the embodiments. Its sole purpose is to present some concepts of the embodiments of the invention in a simplified form as a prelude to the more detailed description that is presented later.

Embodiments of the invention relate to method, apparatus, and system for optimizing performance of a communication unit by a remote server. In one embodiment, the method for optimizing performance of one or more communication units by a remote server, comprises: collecting data from the one or more communication units; generating a policy, for each of the one or more communication units, based on the collected data; and sending the policy to each of the one or more communication units, wherein the policy comprises conditions for operation of the one or more communication units, wherein the one or more communication units implement the policy according to time-varying data.

In one embodiment, the system includes a machine-readable storage medium having computer executable instructions stored thereon that when executed cause a processor of a remote server to perform the method for optimizing performance of one or more communication units by the remote server.

In one embodiment, the communications system comprises a WiFi Access Point or a Digital Subscriber Line Access Multiplexer (DSLAM) to perform a method for optimizing performance of one or more communication units coupled to the WiFi Access Point or the DSLAM. In one such embodiment, the method comprises: sending data from one or more communication units to a remote server; receiving a policy from the remote server, wherein the policy comprises conditions for operation of the one or more communication units; and executing the policy by implementing one of first and second algorithms based on the conditions and time-varying data.

In one embodiment, the system includes a machine-readable storage medium having computer executable instructions stored thereon that, when executed, cause a processor, of the WiFi Access Point or the DSLAM, to perform the method for optimizing performance of one or more communication units discussed above.

In one embodiment, the apparatus comprises: a memory; and a processor, coupled to the memory, and operable to: analyze data from one or more communication units; generate a policy, for each of the one or more communication units, based on the collected data; and send the policy to each of the one or more communication units, wherein the policy comprises conditions for operation of the one or more communication units, wherein the one or more communication units implement the policy according to time-varying data.

In one embodiment, the system comprises: one or more communication units; and a server operable to communicate with the one or more communication units, wherein the server comprises: a memory; and a processor, coupled to the memory, and operable to: analyze data from the one or more communication units; generate a policy, for each of the one or more communication units, based on the collected data; and send the policy to each of the one or more communication units, wherein the policy comprises conditions for operation of the one or more communication units, wherein the one or more communication units implement the policy according to time-varying data.

In one embodiment, the communication unit comprises: a transmitter to send data to a remote server; a receiver to receive a policy from the remote server, wherein the policy comprises conditions for operation of the communication unit; and a processor to execute the policy by implementing one of first and second algorithms based on the conditions and time-varying data.

The embodiments of the invention are not limited to DSL or WiFi communication systems of the examples and embodiments above, but apply to any communication system that needs to run/execute adaptation algorithms (also called algorithms) to cope with real-time variations in link channel, noise, interference, and other factors that affect the communication performance. The policy generated by the remote server can be a result of analyzing hundreds (or even millions) of similarly situated communication units, or any other expert knowledge made available to the remote server. Generally, a communication unit does not have the processing power, storage space, or access to large amounts of data to generate the best policy to achieve optimal performance efficiency. Furthermore, a communication unit typically does not have access to historical data related to communications with other stations. Additionally, communication units may lose history data when there is power outage or user-initiated power cycling. The remote server resolves the above problems and provides an optimum policy for the communication units to use that can be based on analysis of a large amount of operational data of the communication units and other similarly situated communication units or any other expert knowledge.

While the summary of the invention has been described in conjunction with specific embodiments thereof, many alternatives, modifications and variations of such embodiments will be apparent to those of ordinary skill in the art in light of the following description. The embodiments of the invention are intended to embrace all such alternatives, modifications, and variations as to fall within the broad scope of the appended claims.

The following description and the annexed drawings set forth in detail certain illustrative aspects of the embodiments of the invention. These aspects, however, are only indicative of the various ways in which the principles of the embodiments of the invention may be employed. The embodiments of the invention are intended to embrace all equivalents in the form of alternatives, modifications, and variations that fall within the broad scope of the appended claims. Other advantages and novel features of the embodiments of the invention will become apparent from the following detailed description of the embodiments of the invention when considered in conjunction with the drawings.

DETAILED DESCRIPTION

Embodiments of the invention relate to method, apparatus, and system for optimizing performance of a communication unit by a remote server. As mentioned in the background section, the actual performance of the communication unit could be dependent on the assumptions made by the designer of the communication system. In one example, as provided in the background section, the actual performance of the WiFi rate adaptation algorithm is dependent on the assumptions made by the designer of the WiFi communication system. These assumptions may be static assumptions that do not change over time. The designer's assumptions, however, may be quite different from the actual operational environments and a WiFi communication system might suffer from low performance due to non-ideal design of the adaptation algorithm.

To overcome the above problem, the embodiments herein describe a method, system and apparatus that analyzes real-time and history of operational data related to a communication system and provides rules and conditions for the communication system to improve its performance. The rules and conditions specify the characteristics of the real-time and historical operational data such that the communication unit can select and use the most desired adaptation algorithm to use. In one embodiment, a remote server (also called an optimization center) is operable to collect and process large amounts of data related to the communication system and determine rules and conditions for the communication system that will improve the performance of the communication system. In one embodiment, the remote server collects data periodically and provides updated rules and conditions periodically for the communication system to adapt so that it may improve its performance. The embodiments herein are not limited to a communication system but can be used for any type of communication system that needs to be updated over time to improve its performance to changing environments.

The term "performance" herein refers to a combination of factors including data rate, throughput, power consumption, power, error rate, latency, jitter, etc. Improving performance of the communication system includes increasing data rate, throughput, reducing error rate and latency, improving jitter, power consumption, etc for the communicating system.

The technical effect of the embodiments discussed herein is the improvement of performance of a communication system (e.g., WiFi, Digital Subscriber Line (DSL), etc) by providing the communication system with rules and conditions that were previously not conceivable by the communication system due to lack of information and processing power needed to generate the rules and conditions. In one embodiment, a dedicated server (also referred as "remote server" or "optimization center") may be used to collect operational data related to the communication system, where the operational data may not be accessible or storable by the communication system itself (e.g., data from other communication units or old data that cannot be stored due to memory limitations) process the operational data and provide rules and conditions that when adapted by the communication system causes the performance of the communication system to improve.

For example, the remote server is operable to perform a statistical analysis of hundreds (or even millions) of communication systems working in a similar environment as the communication system of interest. In one embodiment, the remote server is operable to indicate to the communication system of interest how it can improve its overall performance, for example, by aggressively choosing higher transmission rates as opposed to conservatively choosing lower transmission rates.

In one embodiment, when the WiFi communication system has the capability to decode and execute a pre-defined pseudo-code, the remote server can consider many more algorithms that are known to it and send the rules and/or conditions for the algorithm to be used by communication units. For example, the remote server develops a pseudo-code for the communication unit to execute so that it may improve its communication performance. In one embodiment, the pseudo-code is stored in the memory of the communication unit, example memory of an Access Point. The pseudo-code may be coded in any software coding language that is executable by the communication unit, example by a processor of the Access Point. In one embodiment, as the remote server becomes aware of newer and better algorithms, it enforces some of the communication systems to use one of them by sending a proper pseudo-code to the communication units of the communication system.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" herein refers to two or more elements which are in direct contact (physically, electrically, magnetically, optically, etc.). The term "coupled" herein may also refer to two or more elements that are not in direct contact with each other, but still cooperate or interact with each other.

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Figure 2:
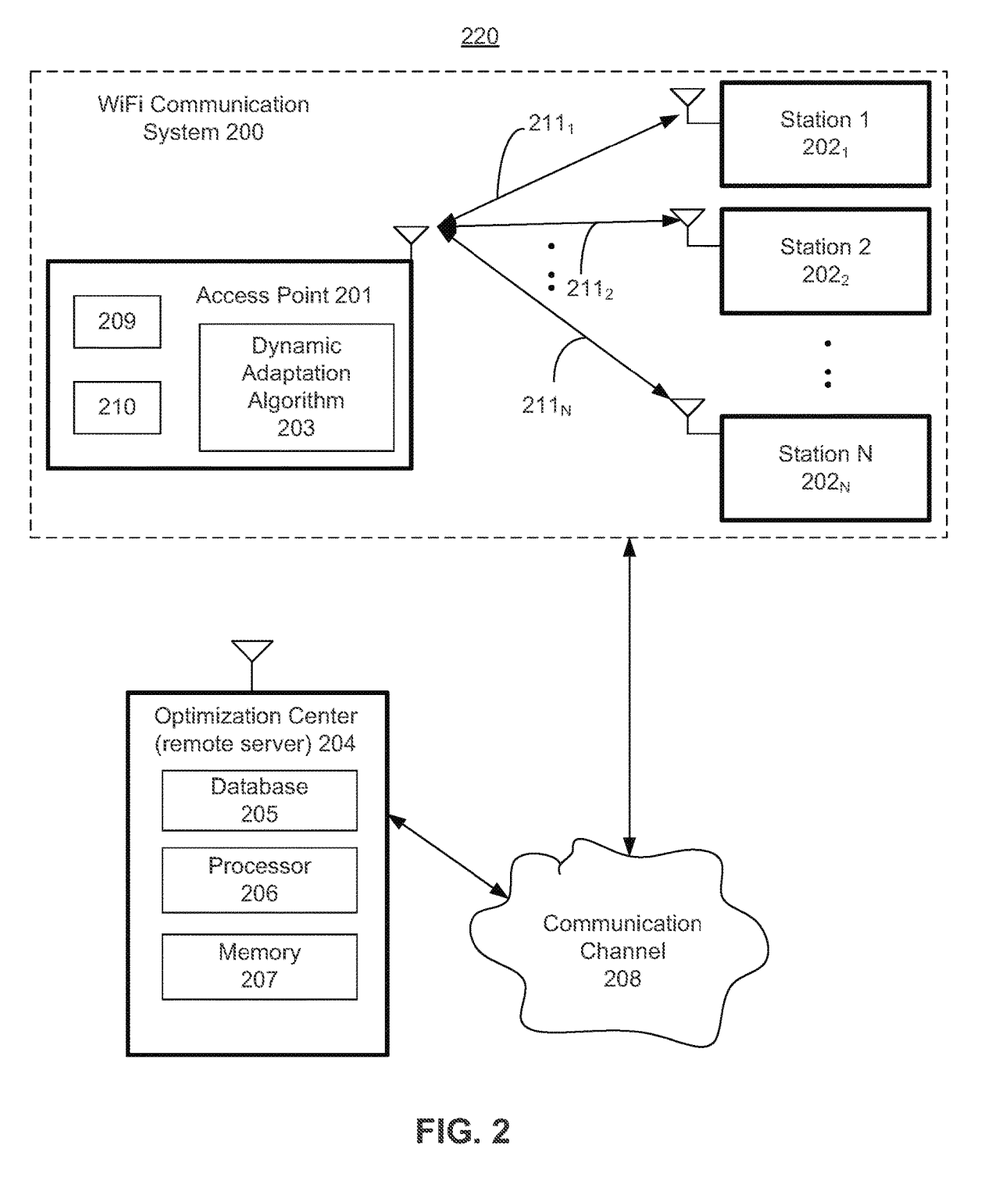
FIG. 2 is a system for optimizing performance of a WiFi communication system by a remote server, according to one embodiment of the invention.

FIG. 2 is a system 220 for optimizing performance of a WiFi communication system 200 by a remote server 204, according to one embodiment of the invention. In one embodiment, the communication system 200 is similar to the communication system of FIG. 1, but is operable to communicate with the remote server 204 (interchangeably referred to as an optimization center). In one embodiment, the WiFi communication system 200 includes an Access Point (AP) 201 which comprises a processor 209, memory 210, and an adaptation algorithm 203 (which may be stored in the memory 210). In one embodiment, the AP 201 is operable to communicate with one or more stations 202.sub.1-N, where N is an integer equal to or greater than 1, by WiFi signals 211.sub.1-N. The term "adaptation algorithm" is interchangeably referred to as "algorithm."

While the embodiment of FIG. 2 illustrates a WiFi communication system 200 with a single AP 201, multiple APs may be used in the WiFi communication system 200 which are operable to communicate with the remote server 204 via the Communication Channel 208. In the embodiments discussed herein the remote server 204 is not part of the communication system 200. In such an embodiment, the communication channel may be one of: the Internet, a TR-069 (Technical Report 069) compatible communications protocol; a Transmission Control Protocol/Internet Protocol (TCP/IP) communications protocol; a Simple Network Management Protocol (SNMP) communications protocol; an out-of-band telephone line protocol; a Digital Subscriber Line Ethernet over Coax (DSL EOC) communications protocol; a cable control channel communications protocol; a powerline control channel communications protocol; a Command Line protocol (CLI); via a wireless device; or via a mobile device.

In one embodiment, the logic unit representing AP 201 and/or the stations 202.sub.1-N can be at least one of the following communication units: a base station; a wireless Local Area Network (LAN) device; a DSLAM; a gateway; a performance enhancement device; a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, the remote server 204 is operable to communicate with the AP 201 and/or with any or all of the stations 202.sub.1-N via the communication Channel 208. In one embodiment the remote server 204 is a cloud server. In one embodiment, the remote server 204 comprises a processor 206, which may be one or more processors, a memory 207 for storing processor executable instructions, and a database 205 to manage data related to the communication system 200.

In one embodiment, the remote server 204 performs a method for optimizing performance of one or more communication units including the AP 201 and the stations 202.sub.1-N. In one embodiment, the remote server 204 is operable to collect data from the one or more communication units (AP 201 and/or the stations 202.sub.1-N). In one embodiment, the remote server 204 periodically collects data from the one or more communication units. The term "periodically" herein refers to regular intervals e.g., once a day, morning and evening of every day, etc.

In one embodiment, the remote server 204 is operable to generate a policy, for each of the one or more communication units (AP 201 and/or the stations 202.sub.1-N) based on the collected data. In one embodiment, the remote server 204 is operable to transmit/send the policy to each of the one or more communication units (AP 201 and/or the stations 202.sub.1-N). The policy generated by the remote server 204 is a result of analyzing hundreds (or even millions) of similarly situated communication units. Generally, an AP does not have the processing power, storage space, or access to large amounts of data to generate the best policy to achieve optimal performance efficiency. Furthermore, an AP does not have access to historical data related to communication with other stations. Additionally, APs may lose data when there is power outage or user-initiated power cycling. The remove server 204 resolves the above problems and provides an optimum policy for the AP 201 to use based on analysis of large amount of operational data of the communication system 200 and other similarly situated communication systems.

Examples of similarly situated communication systems include communications systems having similar communication units. For example, an AP with same power, speed, and brand, and operating with similar (i.e., within 10%) number of stations. Similarly situated communication systems also include communications systems in different geographical areas.

In one embodiment, the remote server 204 transmits/sends the policy to each of the one or more communication units (AP 201 and/or the stations 202.sub.1-N) periodically. For example, the remote server 204 may transmit/send the policy to each of the one or more communication units (AP 201 and/or the stations 202.sub.1-N) when the bandwidth usage of the AP 201 is low (e.g., the AP 201 is operating less than 50% of its capacity to serve communication units) so that it may implement the new policy sent by the remote server 204.

In one embodiment, the policy comprises rules and/or conditions for operation of the one or more communication units (AP 201 and/or the stations 202.sub.1-N). For example, the policy comprises first and second algorithms for adapting the AP 201 to improve its performance. In one embodiment, the one or more communication units (AP 201 and/or the stations 202.sub.1-N) implement the policy according to time-varying data. In one embodiment, the time-varying data comprises location information, current time, and operational data of the one or more communication units (AP 201 and/or the stations 202.sub.1-N). In one embodiment, the location information is determined from a Global Positioning System (GPS) device or setup. The embodiments herein are not limited to two algorithms, but any number of algorithms may be used.

In one embodiment, the communication unit (AP 201 and/or the stations 202.sub.1-N) comprises a transmitter to send data to the remote server 204; a receiver to receive a policy from the remote server 204; and a processor to execute the policy by implementing one of first and second algorithms based on the conditions and time-varying data. The communication units generally do not have the capability in terms of processing resources, access to historical operational data, access to operational data of other similarly situated communication units, etc. Therefore, the prior art communication units cannot use such information for improving their performance. The transmitter discussed above provides data to a central location, i.e. the remote server 204, that has the capability in terms of processing resources, access to historical operational data, access to operational data of other similarly situated communication units, etc, so that it may use such information generate rules and conditions for operating the communication units with enhanced performance. These rules and conditions were previously not conceivable by the communication system (e.g., communication system of FIG. 1) due to lack of information and processing power needed to generate the rules and conditions. The remote server 204, after computing the rules and conditions, provides the rules and conditions to the processors of the communication units, wherein the processors executes their respective policies by implementing one of first and second algorithms based on the rules and/or conditions and time-varying data.

In one embodiment, the one or more communication units (AP 201 and/or the stations 202.sub.1-N) are operable to receive the policy along with one of the first and second algorithms based on the conditions and/or the time-varying data, wherein the first and second algorithms did not exist in the one or more communication units (AP 201 and/or the stations 202.sub.1-N) prior to being provided by the remove server 204. In such an embodiment, the remote server 204 installs a new algorithm 203 in the AP 201, where the new algorithm is executed by the processor 209 of the AP 201.

In one embodiment, the one or more communication units (AP 201 and/or the stations 202.sub.1-N) are operable to receive the policy and implement one of first and second algorithms based on the rule and/or conditions and/or the time-varying data, wherein the first and second algorithms previously existed in the one or more communication units (AP 201 and/or the stations 202.sub.1-N). In such an embodiment, the remote server provides recommendations to the communication units (AP 201 and/or the stations 202.sub.1-N) to use either the first or second algorithm so the communication system 200 may improve its performance.

The conditions may include at least one of: choice of selecting one of the first or second algorithms based on current SNIR (Signal to Noise and Interference Ratio); choice of selecting one of the first or second algorithms based on current time; choice of selecting one of the first or second algorithms based on operational data of the one or more communication units; and choice of selecting one of the first or second algorithms based on location information. In other embodiments, other conditions may be used in conjunction or absence to the above listed conditions. The rules may include equations, when executed in the algorithms, will change how the conditions are evaluated by the algorithms.

In one embodiment, the remote server 204 generates the policy by performing analysis on the collected data, wherein the collected data comprises operational information and historical data about each of the one or more communication units. In one embodiment, the remote server 204 applies the analysis to generate conditions for when to implement one of the first and second algorithms. In one embodiment, the remote server 204 generates the policy by generating a pseudo-code or code for an adaption algorithm to be executed on the one or more communication units (AP 201 and/or the stations 202.sub.1-N).

In one embodiment, the first algorithm comprises: monitoring received signal strength indication (RSSI); and adapting a data rate according to a mapping of the RSSI from a lookup table. In one embodiment, the second algorithm comprises: counting a first number of consecutive successful transmissions from the one or more communication units to other communication units; counting a second number of consecutive failed transmissions from the one or more communication units to other communication units; adjusting a data rate when the first number exceeds a first threshold; and adjusting the transfer rate when the second number exceeds a second threshold. In other embodiments, other algorithms may be used for first and second algorithms.

The following is an exemplary embodiment showing the process of determining an optimum algorithm by the remote server 204. In one embodiment, the remote server 204 selects one of the first or second algorithms for the communication units (AP 201 and/or the stations 202.sub.1-N) to achieve optimal performance efficiency for the communication system 200. In one embodiment, first algorithm determines data transmission rates for the communication units based on RSSI while the second algorithm determines data transmission rates based on a number of consecutive successful transmissions and on a number of consecutive failed transmissions. As mentioned above, in one embodiment, the communication units (AP 201 and/or the stations 202.sub.1-N) have the first and second algorithms previously stored, but do not know which algorithm is more efficiency for the communication system 200. In such an embodiment, the remote server 204 provides recommendations to the communication units about which algorithm to use.

In one embodiment, in the first algorithm the communication units (AP 201 and/or the stations 202.sub.1-N) monitor the RSSI in real-time and adapts their transmission rates according to the instantaneous RSSI value using a mapping table (Table 1) as shown below. TABLE-US-00001 TABLE 1 RSSI to rate mapping for first algorithm RSSI value Rate −92 dBm or below 6 Mbps −92 dBm~−90 dBm 9 Mbps −90 dBm~−88 dBm 12 Mbps −88 dBm~−86 dBm 18 Mbps −86 dBm~−84 dBm 24 Mbps −84 dBm~−82 dBm 36 Mbps −82 dBm~−80 dBm 48 Mbps −80 dBm or above 54 Mbps Table 1 is only shown as an example and a person skilled in the art would realize that the communication units may use different rates for different RSSI values other than the ones shown above.

In one embodiment, the second algorithm for the communication units (AP 201 and/or the stations 202.sub.1-N) uses a higher data rate after K (e.g., 10) consecutive successful transmissions, and uses a lower data rate after M (e.g., 2) consecutive failed transmissions. In one embodiment, the communication units (AP 201 and/or the stations 202.sub.1-N) provide to the remove server 204 operational data including RSSI, SNR, rate used for transmitting a packet, corresponding result on successful packet delivery, and other relevant data collected in real-time. In one embodiment, communication units (AP 201 and/or the stations 202.sub.1-N) may accumulate such data within the communication units (AP 201 and/or the stations 202.sub.1-N) and then send the accumulated data to the remote server 204. In one embodiment, the data transmitted to the remote server 204 is non-real-time data because it is sent after some time (e.g., end of the day).

In one embodiment, the remote server 204 stores such data in its database 205 and performs a full analysis based on all the stored data and any other knowledge available at the remote server 204. In one embodiment, the other knowledge includes similar statistics, as those provided by the communication units (AP 201 and/or the stations 202.sub.1-N) to the remote server 204, from other similar communication units in other similar geographical localities.

In one embodiment, the remote server 204 determines the presence of intermittent high-power interference from other near-by WiFi systems. When other WiFis' high-power packets collide with the communication system 200's packet, the packet is lost regardless of the rate selection. In one embodiment, the remote server 204 determines that other noise or interference is never observed for the communication system 200, and concludes that it is best to adapt rates for the communication units (AP 201 and/or the stations 202.sub.1-N) as a function of channel strength, or RSSI, only. In such an embodiment, the remote server 204 sends a control signal to communication units (AP 201 and/or the stations 202.sub.1-N) asking the communication units (AP 201 and/or the stations 202.sub.1-N) to use the first algorithm all the time instead of the second algorithm.

In one embodiment, the remote server 204 determines that there is no high-power WiFi interference at all, but channel changes faster than typical static indoor wireless channel (possibly due to people moving around the AP 201). For example, the channel variation tends to be faster between noon and midnight. In such an embodiment, the remote server 204 concludes that it is best to use the second algorithm instead of the first algorithm by the communication units (AP 201 and/or the stations 202.sub.1-N). In one embodiment, the remote server 204 may determine optimum values for K and M to be used by the communication units (AP 201 and/or the stations 202.sub.1-N) in different times of the day. For example, K=10 and M=1 between noon and midnight; and K=20 and M=2 between midnight and noon.

In one embodiment, the remote server 204 sends a control signal to communication units (AP 201 and/or the stations 202.sub.1-N) asking communication units (AP 201 and/or the stations 202.sub.1-N) to use the second algorithm with the optimized K and M values depending on time in the day. In case the WiFi communication system 200 is not capable of changing the values of K and M as a function of time, the remote server 204 can send two control signals per day, one at noon and another at midnight.

In one embodiment, when the WiFi communication system 200 has the capability to decode and execute a pre-defined pseudo-code, the remote server 204 can consider many more algorithms that are known to it and send the rules and/or conditions for the algorithm to be used by communication units (AP 201 and/or the stations 202.sub.1-N). In one embodiment, the remote server 204 develops a pseudo-code for the communication unit to execute so that it may improve its communication performance. In one embodiment, the pseudo-code is stored in the memory of the communication unit, example memory 210 of the AP 201. The pseudo-code may be coded in any software coding language that is executable by the communication unit, example by the processor 209 of the AP 201. In one embodiment, as the remote server 204 becomes aware of newer and better algorithms, it enforces some of the communication systems to use one of them by sending a proper pseudo-code to the communication units (AP 201 and/or the stations 202.sub.1-N) of the communication system 200.

Figure 3:
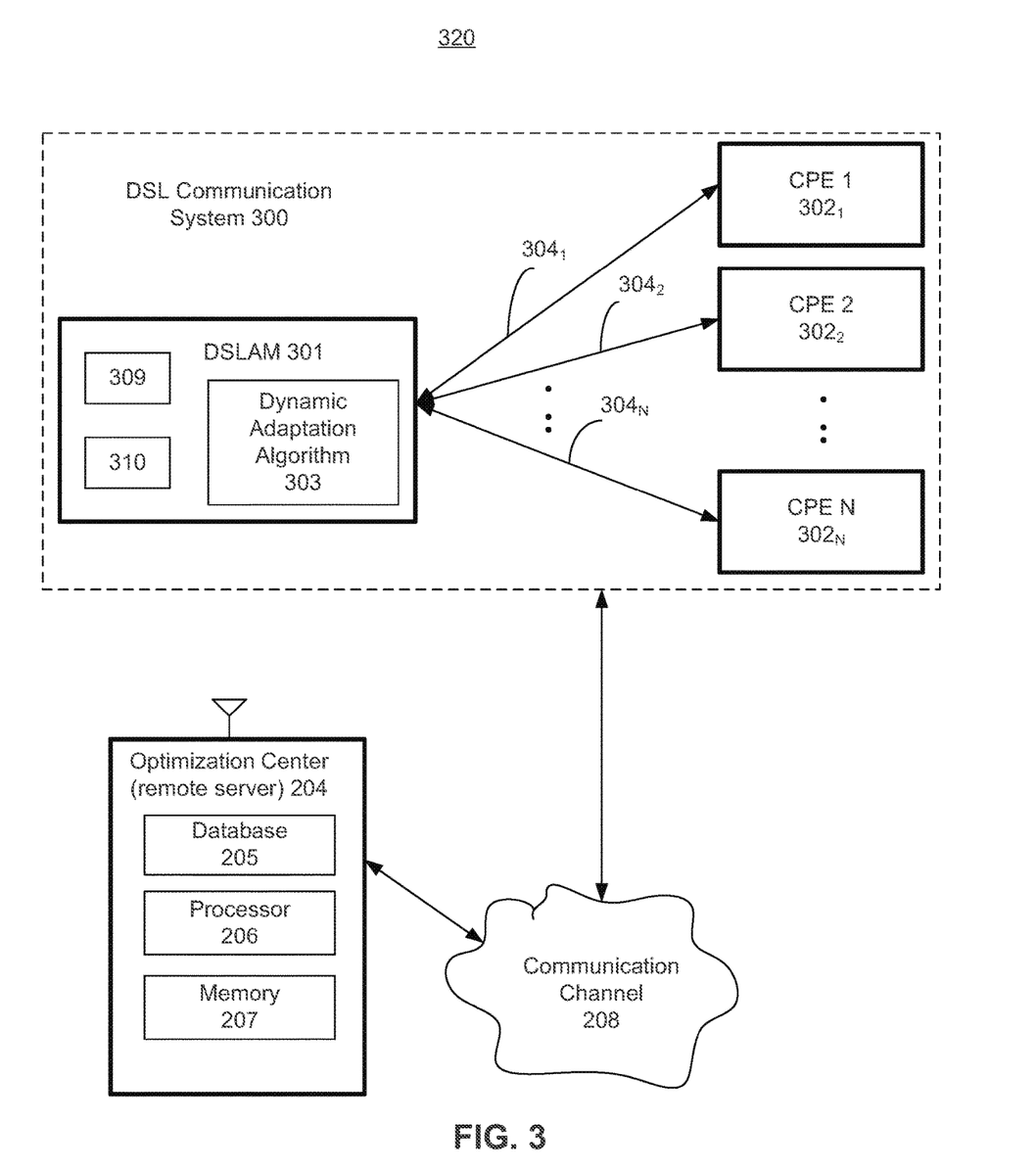
FIG. 3 is a system for optimizing performance of a Digital Subscriber Line (DSL) communication system by a remote server, according to one embodiment of the invention.

FIG. 3 is a system 320 for optimizing performance of a Digital Subscriber Line (DSL) communication system 300 by the remote server 204, according to one embodiment of the invention. The embodiment of FIG. 3 is similar to the embodiment of FIG. 2 in concept, but applicable for DSL systems. The embodiments of the invention are not limited to DSL or WiFi communication systems, but apply to any communication system that needs to run/execute adaptation algorithms (also called algorithms) to cope with real-time variations in link channel, noise, interference, and other factors that affect communication performance.

In one embodiment, the DSL communication system 320 comprises a Digital Subscriber Line Access Multiplexer (DSLAM) 301 that connects to one or more Customer Premises Equipment (CPEs) 302.sub.1-N by means of DSL signals 304.sub.1-N, where N is an integer equal to or greater than 1. In one embodiment, the remote server 204 performs a method for optimizing performance of the one or more communication units including the DSLAM 301 and the CPEs 302.sub.1-N. In one embodiment, the remote server 204 is operable to collect operational data from the one or more communication units (DSLAM 301 and/or the CPE 302.sub.1-N). In one embodiment, the remote server 204 periodically collects operational data from the one or more communication units.

In one embodiment, the operational data collected by the remote server 204 includes at least one of: band preference indication; margin cap mode indication; indication that margin per tone should be kept smaller than the maximum SNR (Signal to Noise Ratio) margin; service priorities pertaining to net data rate; service priorities pertaining to excess margin; service priorities pertaining to excess margin per tone; service priorities pertaining to delay; service priorities pertaining to impulse noise protection; indication of loading algorithms used with a first DSL system; indication of power allocation algorithms used with the first DSL system; maximum attainable data rate; current data rate; margin; channel attenuation per tone; average attenuation; quiet line noise per tone; active line noise per tone; SNR per tone; transmitted PSD per tone; downstream power back-off shaped parameters (DPBOSHAPED); upstream power back-off shaped parameters (UPBOSHAPED); echo response; band preference; margin cap mode; Forward Error Correction (FEC) count; code violation count; errored seconds; severely errored seconds; number of retraining count; current delay; error distributions; current impulse noise protection; or FEC and interleaving parameters. The above listed operational data is not an exclusive list. More operational data may be used by the remote server 204 to compute rules and/or conditions for the communication units.

In one embodiment, the remote server 204 collects configuration parameters associated with the one or more communication units. The configuration parameters include at least one of: maximum nominal power spectral density (MAXNOMPSD); maximum nominal aggregate transmit power (MAXNOMATP); power cutback (PCB); DPBOSHAPED; UPBOSHAPED; fine gains; gi; transmit spectral scaling factors; tssi; power spectral density mask (PSDMASK); power spectral density level; maximum received power (MAXRXPWR); upstream power "back-off" parameters (UPBOKLE); margin cap mode; carrier mask (CARMASK); minimum impulse noise protection (MININP); maximum delay (MAXDELAY); target margin (TARSNRM); minimum SNR margin (MINSNRM); maximum SNR margin (MAXSNRM); band preference indication (PREFBAND); target data rate; minimum data rate; maximum data rate; FEC and interleaving parameters; per tone bit cap (BCAP[n]); per tone target margin (TARSNRM [n]); reference noise (REFNOISE). The above listed configuration parameters is not an exclusive list. More configuration parameters may be used by the remote server 204 to compute rules and/or conditions for the communication units.

As discussed with reference to FIG. 2, the remote server 204 of FIG. 3 is operable to generate a policy, for each of the one or more communication units (DSLAM 301 and/or the stations 302.sub.1-N), based on the collected operational data, according to one embodiment. In one embodiment, the remote server 204 is operable to transmit/send the policy to each of the one or more communication units (DSLAM 301 and/or the CPE 302.sub.1-N). The policy generated by the remote server 204 is a result of analyzing hundreds (or even millions) of similarly situated communication units. The DSLAM 301 does not have the processing power, storage space, or access to large amounts of data to generate the best policy to achieve optimal performance efficiency. Furthermore, DSLAM 301 does not have access to historical data related to communication with other CPEs connected to other DSLAMs. Additionally, DSLAM 301 may loose data when there is power outage or user-initiated power cycling. The remote server 204 resolves the above problems and provides an optimum policy for the DSLAM 301 to use based on analysis of large amount of operational data of the communication system 300 and other similarly situated communication systems. The optimum policy can be determined based on expert knowledge outside of the communication system where the expert knowledge can be obtained from lab testing, simulation or any other research methods. The policy can be adaptively modified even after the full deployment of the communication system, and hence does not suffer from limited knowledge that is used at the time of manufacturing the communication system. In the embodiments discussed herein the remote server 204 is not part of the communication system 300.

In one embodiment, when the DSL communication system 300 has the capability to decode and execute a pre-defined pseudo-code, the remote server 204 can consider many more algorithms that are known to it and send the rules and/or conditions for the algorithm to be used by communication units (DSLAM 301 and/or the CPEs 302.sub.1-N). In one embodiment, the remote server 204 develops a pseudo-code for the communication unit to execute so that it may improve its communication performance. In one embodiment, the pseudo-code is stored in the memory of the communication unit, example memory 310 of the DSLAM 301. The pseudo-code may be coded in any software coding language that is executable by the communication unit, example by the processor 309 of the DSLAM 301. In one embodiment, as the remote server 204 becomes aware of newer and better algorithms, it enforces some of the communication units to use one or more of them by sending a proper pseudo-code to the communication units (DSLAM 301 and/or the CPEs 302.sub.1-N) of the communication system 300.

Following is an exemplary embodiment of how the remote server 204 can improve the performance of a DSL system. In DSL systems, for example the system 300, downstream (DS) margin is an important line performance metric that can be monitored by CPEs 302.sub.1-N in real-time. In general, a higher margin indicates an exponentially smaller chance of errors for the delivery of video or data packets over DSL links 304.sub.1-N. When the margin becomes very small, typically below 0 dB, the link will experience errors that can cause serious impacts on packet delivery to the CPEs 302.sub.1-N. To prevent continuation of such an unreliable link quality over a long time, CPEs 302.sub.1-N can initiate a retraining procedure and improve the operation conditions. The retraining procedure may take 20 to 60 seconds. In one embodiment, the above feature of DSL systems is implemented by CPEs 302.sub.1-N monitoring DS margins and initializing a retraining process when the margin becomes below a pre-configured threshold value 'T.' Conventionally, 'T' is set to 0 dB and controlled via the DSL line's profile.

The remote server 204 may collect operational and performance data of the DSL system 300, analyze the historical data (operational and performance data) associated with the DSL system 300, and determine the best estimated value of 'T' for each line and applies the value to each line.

The term "line" herein refers to a communication link (wired or wireless) between the DSLAM 301 and the corresponding CPE. The value of 'T' may be analyzed per-line basis by the remote server 204. Different values of 'T' can be applied by the remote server 204 to different DSL lines depending on their historical and environmental characteristics.

Each CPE among the CPEs 302.sub.1-N applies an algorithm to tune its performance. For example, the CPE applies a rule and/or condition to adapt the value of 'T' in real-time as a function of the real-time data (operational and performance) that is available in the corresponding CPE. The CPEs 302.sub.1-N are operable to apply the following rules and conditions. If video traffic is observed by the CPE over the line for more than t.sub.1 (e.g., 1 minute), then the CPE updates the value of 'T' to 'T.sub.1' (e.g., 2 dB). Such a rule allows the CPE to react fast on pixelization problems associated with video traffic. In this example, the conditions are the choice of 't.sub.1' and 'T.sub.1', while the rule is the "if, then" equation. Typically each retraining process of the CPE causes discontinuation/interruption of video and data services for a short time (e.g., 10-45 seconds), but such an interruption can be preferable to a persistent pixelization problem of the video traffic for several minutes or more. If no video traffic is observed by the CPE for more than 't.sub.2' (e.g., 10 minutes) then the CPE updates the value of 'T' to 'T.sub.2' (e.g., 0 dB). In this example, the conditions are the choice of 't.sub.2' and 'T.sub.2,' while the rule is the "if, then" equation. This rule allows the CPE to reduce the chance of initiating a retraining process that can interrupt data traffic. Data service is more resilient to errors compared to video traffic, and the errors that can happen for a small margin (e.g., 0-2 dB) are likely tolerable for data traffic.

The above example of the rule and/or condition involves real-time monitoring of the data of the DSL system 300 and real-time adaptation algorithm within the DSL system 300. In some embodiments, the data of the DSL system 300 may not be entirely in real-time but the data update may be frequent enough (e.g., 5 minutes) to behave like real-time data.

In one embodiment, the threshold values 't.sub.1,' 't.sub.2,' 'T.sub.1' and 'T.sub.2' used by the rules/conditions discussed above are not statically kept in the DSL system 300, but optimized by the remote server 204. In one embodiment, the CPE continues to keep its rule/condition, but the parameters of the rules, i.e. the threshold values (conditions) 't.sub.1,' 't.sub.2,' 'T.sub.1' and 'T.sub.2,' are updated in the CPEs 302.sub.1-N by the remote server 204. In such an embodiment, the remote server 204 collects and analyzes historical operational data and any side information (e.g., data from other similarly situated DSL systems) that is available at the remote server 204.

Continuing with the exemplary embodiment discussed above, the remote server 204 will choose 'T.sub.1'=0 dB for a DSL line if pixelization has hardly happened even for margins between 0 and 2 dB in the historical operational data, but will choose 'T.sub.1'=4 dB if pixelization always occurred and continued for several minutes for margins between 0 and 4 B. Such long-term adaptation of the rules by remote server 204 allows the DSL system 300 to perform at its optimum ability under all circumstances. In one embodiment, the switching of modes discussed above happens in real-time or very frequently, but the update of threshold values or rules to be used by the CPEs 302.sub.1-N happens at a much lower frequency. In one embodiment, the remote server transmits the updated policy (with new threshold values) to the DSL system 300 a once per day.

While the embodiments of FIG. 3 are discussed in terms of margin and video traffic in the DSL system 300, the embodiments can be applied to any DSL or other communication system adaptation algorithm that reacts in real-time to other data parameters without changing the essence of the embodiments of the invention.

Figure 4:
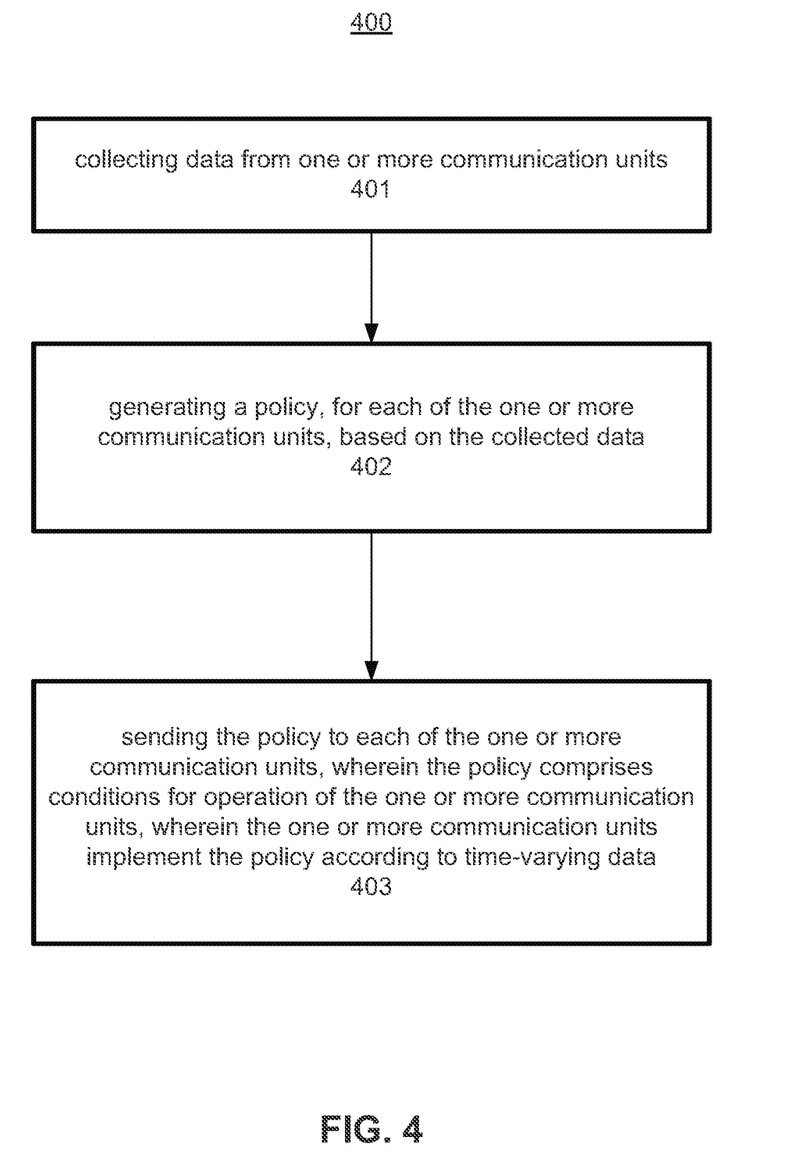
FIG. 4 is a method performed by a remote server for optimizing performance of the communication system by the remote server, according to one embodiment of the invention.

FIG. 4 is a method 400 performed by a remote server for optimizing performance of a communication system, according to one embodiment of the invention. Although the blocks in the flowcharts with reference to FIG. 4 are shown in a particular order, the order of the actions can be modified. Thus, the illustrated embodiments can be performed in a different order, and some actions/blocks may be performed in parallel. The flow chart of FIG. 4 is illustrated with reference to the embodiments of FIGS. 2-3.

At block 401, the remote server 204 collects data (operational and/or performance data) from the one or more communication units. As discussed above, the communication units in FIG. 2 are AP 201 and/or the stations 202.sub.1-N while communication units in FIG. 3 are DSLAM 301 and/or the CPE 302.sub.1-N. In one embodiment, the communication units are at least one of a base station; a wireless LAN device; a DSLAM; a gateway; a performance enhancement device; a DSL CPE modem; an in-home powerline device; a HPNA based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; a STB/STU customer electronics device; an IP enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

At block 402, the remote server 204 generates a policy, for each of the one or more communication units based on the collected data. As discussed above, the policy with reference to FIG. 2 comprises first and second algorithms (also called adaptive algorithms). In one embodiment, the first algorithm comprises: monitoring received signal strength indication (RSSI); and adapting a transfer rate according to a mapping of the RSSI from a lookup table. In one embodiment, the second algorithm comprises: counting a first number of consecutive successful transmissions from the one or more communication units to other communication units; counting a second number of consecutive failed transmissions from the one or more communication units to other communication units; adjusting a transfer rate when the first number exceeds a first threshold; and adjusting the transfer rate when the second number exceeds a second threshold. In other embodiments, other algorithms may be used for first and second algorithms.

With reference to FIG. 3, the policy may comprise rules and conditions such as the threshold values 't.sub.1,' 't.sub.2,' 'T.sub.1' and 'T.sub.2' for the DSL system 300 and equations that use these threshold values. Other policies may be used for the above systems of FIGS. 2-3 and for other systems.

At block 403, the remote server 204 sends the policy to each of the one or more communication units, wherein the one or more communication units implement the policy according to time-varying data (data collected by the communication units of the communication systems).

Figure 5:
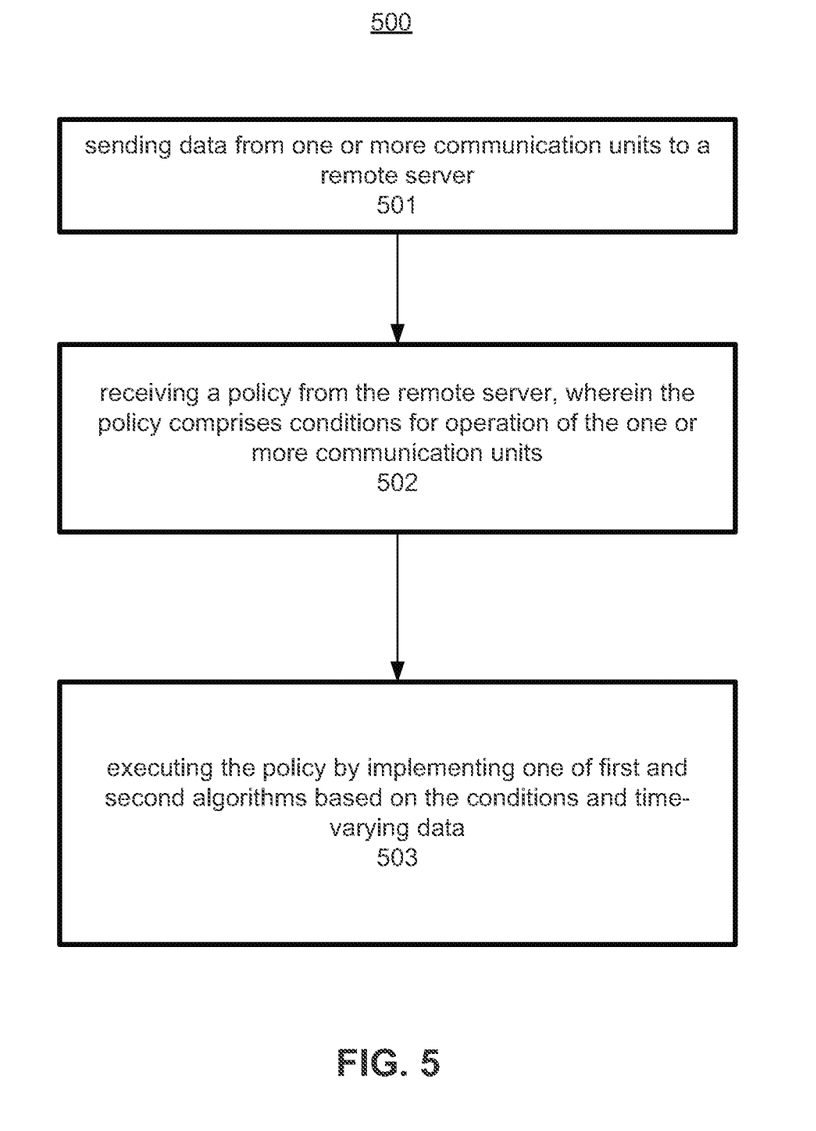
FIG. 5 is a method performed by the communication system for optimizing performance of the communication system by the remote server, according to one embodiment of the invention.

FIG. 5 is a method 500 performed by a communication system for optimizing performance of the communication system by a remote server, according to one embodiment of the invention. Although the blocks in the flowcharts with reference to FIG. 5 are shown in a particular order, the order of the actions can be modified. Thus, the illustrated embodiments can be performed in a different order, and some actions/blocks may be performed in parallel. The flow chart of FIG. 5 is illustrated with reference to the embodiments of FIGS. 2-3. So as to avoid repetitiveness, only the processes performed by the communication units are discussed.

At block 501, the one or more communication units send data to the remote server 204. The data may be operational data, performance data, or any other time-varying data. At block 502, the one or more communication units receive a policy generated by the remove server 204, wherein the policy comprises rules and/or conditions for operation of the one or more communication units. At block 503, the one or more communication units execute the policy sent by the remote server 204 to implement an algorithm based on the rules and/or conditions and time-varying data. As discussed above, the policy with reference to FIG. 2 comprises first and second algorithms (also called adaptive algorithms). In one embodiment, the first algorithm comprises: monitoring received signal strength indication (RSSI); and adapting a transfer rate according to a mapping of the RSSI from a lookup table. In one embodiment, the second algorithm comprises: counting a first number of consecutive successful transmissions from the one or more communication units to other communication units; counting a second number of consecutive failed transmissions from the one or more communication units to other communication units; adjusting a transfer rate when the first number exceeds a first threshold; and adjusting the transfer rate when the second number exceeds a second threshold. In other embodiments, other algorithms may be used for first and second algorithms. With reference to FIG. 3, the policy may comprise rules and conditions such as the threshold values t.sub.1, t.sub.2, T.sub.1 and T.sub.2 for the DSL system 300. Other policies may be used for the above systems of FIGS. 2-3 and for other systems.

Figure 6:
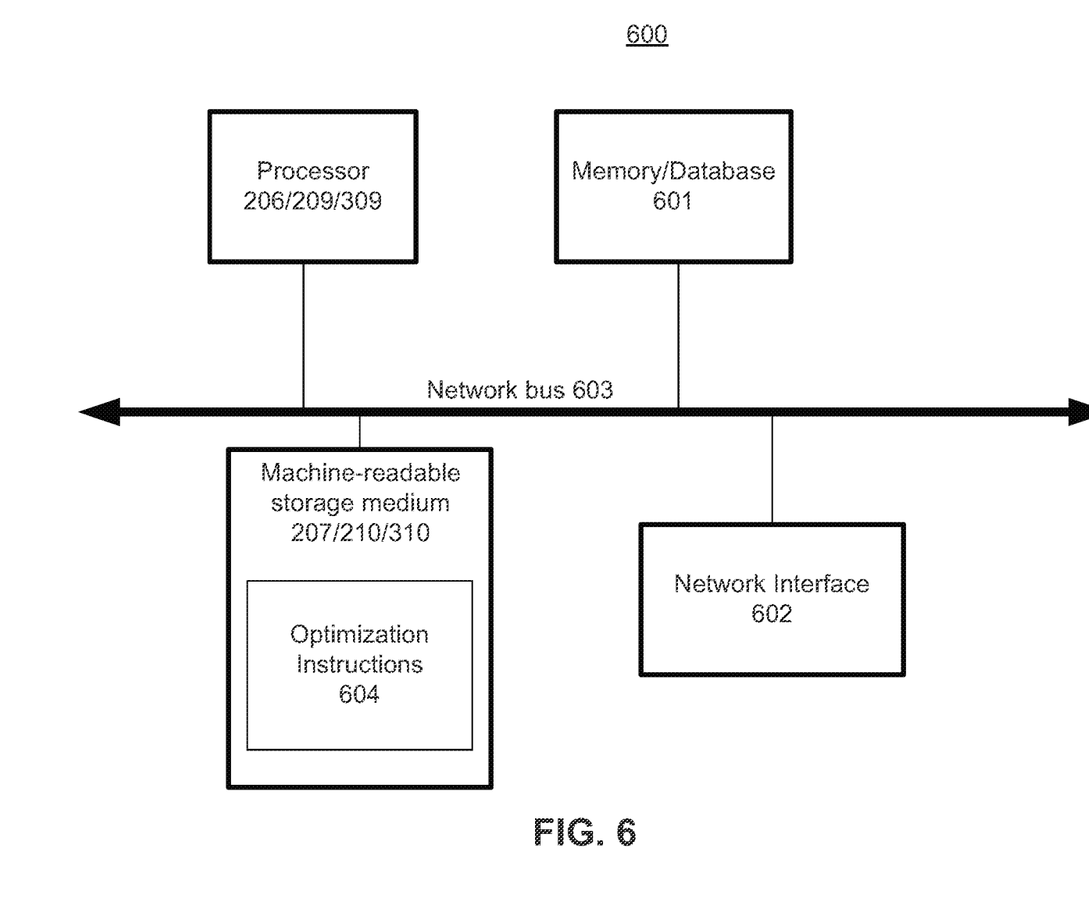
FIG. 6 is a processor-based system having machine-readable storage medium with computer executable instructions for optimizing performance of the communication system by the remote server, according to one embodiment of the invention.

FIG. 6 is a processor-based system 600 having machine-readable storage medium with computer executable instructions 604 for optimizing performance of the communication system by a remote server, according to one embodiment of the invention. Machine-readable storage medium is one of 207, 210, or 310 (collectively referred to as "207/201/310"). The computer/machine-readable/executable instructions are executed by a processor (e.g., processor 206 of the remote server, or processors 209 and 309 of the AP 201 or DSLAM 301 respectively). Elements of embodiments are also provided as a machine-readable medium for storing the computer-executable instructions (e.g., instructions to implement the flowcharts of FIGS. 4-5 and other processes discussed in the description).

In one embodiment, the processor-based system 600 further comprises a database 601 to store data used by the instructions 604. In one embodiment, the processor-based system includes a network interface 602 to communicate with other devices. In one embodiment, the components of the processor-based system 600 communicate with one another via a network bus 603.

The machine-readable storage medium 207/210/310 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the invention may be downloaded as a computer program (e.g., BIOS) which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description.

For example, the embodiments discussed above can apply to a communication system comprising a performance enhancement device. A performance enhancement device may comprise a signal conditioning device, a diagnostic and remedy guidance device, or a noise cancellation device. A noise cancellation device, among other things, acts to cancel noise and interference present on the DSL line, either autonomously or in conjunction with commands from the remote server. In one embodiment, the performance enhancement device is communicatively coupled to the remote server 204 via the Communication Channel 208. In such an embodiment, impulse noise cancellation feature of the performance enhancement device may be turned on and off based on the real-time observation of noise, and the actual algorithm for deciding on-off can be distributed where long-term thresholds/rules and conditions are calculated by the remote server 204 and transmitted to the performance enhancement device. In one embodiment, the remote server 204 forces the actual transition in the performance enhancement device as a function of real-time observation of the noise data.

Another alternative embodiment related to a WiFi system is described as follows. In a typical WiFi communication system, Carrier Sense Multiple Access (CSMA) protocol is used for multiple access. Due to the nature of wireless channel, some of the stations (clients) might not be able to hear each other while both can reach the AP with strong power. This phenomenon is known as Hidden Node problem. One way to resolve this problem is to schedule the data transmission using Request to Send (RTS) and Clear to Send (CTS) mechanisms. Such a use of RTS/CTS incurs overhead in channel usage, but prevents disastrous packet collisions by the two stations.

In one embodiment, the remote server 204 collects operational and performance data of the WiFi AP 201 (and other APs) and/or stations 202.sub.1-N. In one embodiment, the remote server 204 analyzes the historical data and determines the best value for each AP (on or off) and applies the value to each AP. In one embodiment, the value is analyzed per-AP by the remote server 204, and therefore different values can be applied to different APs depending on their data characteristics.

In one embodiment, each AP is operable to apply a rule with conditions to adapt RTS/CTS on/off in real-time as a function of real-time data available to the local AP. In one embodiment, the rule generated by remote server and made available in the AP is that if a large packet error rate is detected for more than t.sub.1 (e.g., 1 minute), the AP turns on RTS/CTS. In one embodiment, the rule generated by remote server and made available in the AP is that if a large packet error rate is not detected for more than t.sub.2 (e.g., 10 minutes), then the AP turns off RTS/CTS.

In the above embodiment, two or more operation modes are described in context of a local communication device (e.g., AP) selecting the operation mode to use in real-time. In one embodiment, the selection of the operation mode is a function of the real-time data that is locally available. In other embodiments, the data might not be in real-time but the data update may be frequent enough for this idea to consider the data as real-time.

In one embodiment, the rules and/or conditions e.g., the threshold values 't.sub.1', and 't.sub.2,' and equations applying them, are not statically kept as in AP, but optimized by the remote server 204. In one embodiment, the threshold values 't.sub.1', and 't.sub.2,' and/or the equations are updated by the remote server 204 using historical data and any side information that is available at the remote server side. In the above alternative embodiment, RTS/CTS was involved, however, the essence of the embodiments can be applied to any WiFi adaptation algorithm that reacts in real-time to other data parameters. WiFi adaptation algorithms include control of fragmentation, channels, association, etc.

The embodiments of the invention are intended to embrace all such alternatives, modifications, and variations as to fall within the broad scope of the appended claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A communication system comprising:
a first interface coupled to a first communication unit, the first interface receives a first set of collected data associated with a first network managed by the first communication unit;
a second interface coupled to a second communication unit, the second interface receives a second set of collected data associated with a second network managed by the second communication unit, the second network being a different network than the first network;
a memory coupled to the first and second interfaces, the memory stores the first and second sets of collected data;
a processor coupled to the memory, the processor generates at least one policy based at least in part on an analysis of the first and second sets of collected data; and
a third interface coupled to the processor, the third interface transmits, in response to the processor determining a change in performance in at least one of the first network or the second network, the at least one policy to the first communication unit that makes a performance-related adjustment within the first network based on the at least one policy.

2. The communication system of claim 1 wherein the adjustment within the first network is an implementation of an algorithm.

3. The communication system of claim 1 where in the adjustment within the first network is a change in a parameter value.

4. The communication system of claim 1 wherein the first communication unit reduces interference in the second network based on an implementation of the at least one policy within the first network.

5. The communication system of claim 4 wherein the at least one policy adjusts channel transmission characteristics of at least one wireless channel within the first network.

6. The communication system of claim 5 wherein the channel transmission characteristics comprise a modification to a transmission band across the at least one wireless channel within the first network.

7. The communication system of claim 1 wherein the first and second sets of collected data comprise historical data.

8. The communication system of claim 1 wherein the processor:
   generates a first control signal that is sent to the first communication unit at a first pre-defined time, the first control signal comprising a first policy adjustment to the first network; and
   generates a second control signal that is sent to the second communication unit at a second pre-defined time, the second control signal comprising a second policy adjustment to the second network.

9. The communication system of claim 8 wherein the first pre-defined time and the second pre-defined time are different.

10. The communication system of claim 8 wherein the first policy adjustment and the second policy adjustment are different.

11. The communication system of claim 1 wherein the first and second communication units are Wi-Fi access points.

12. The communication system of claim 1 wherein the first and second communication units are cellular base stations.

13. The communication system of claim 12 wherein the first communication unit is a small cell base station.

14. The communication system of claim 1 wherein the first and second sets of collected data comprise RSSI measurements collected within the first and second networks.

15. The communication system of claim 14 wherein the at least one policy adjusts a transmission rate of at least one channel within the first network.

16. The communication system of claim 1 wherein the first and second sets of collected data comprise collected measurements related to SNR across a plurality of wireless channels within the first and second networks.

17. The communication system of claim 16 wherein the at least one policy adjusts a transmission power level across a first wireless channel within the plurality of wireless channels.

18. The communication system of claim 1 wherein two interfaces within the first, second and third interfaces are the same interface.

19. A method for managing a plurality of networks, the method comprising:
   receiving, by a server, from network monitoring devices that monitor data associated with an operation of two or more communication units located in at least two networks within the plurality of networks, the data comprising a parameter;
   processing, by the server, the received data;
   based on the processed data, determining a policy for at least one of the two or more communication units; and
   in response to the server detecting a degradation of network performance in at least one network within the plurality of networks, communicating the policy to at least one or more communication units that implement one or more algorithms that use the parameter and at least one rule or one condition for the one or more communication units to improve a performance of the one or more communication units.

20. The method of claim 19 wherein determining the policy comprises selecting the policy from a set of policies that are stored on the one or more communication units and wherein the communicated policy updates the one or more algorithms implemented on the one or more communication units.

21. The method of claim 19 wherein the one or more communication units comprise a Wi-Fi access point.

22. The method of claim 19 wherein the one or more communication units comprise a cellular base station.

23. The method of claim 19 wherein the at least one rule or one condition comprises an adjustment to a wireless transmission band within the plurality of networks.

* * * * *